US008426777B2

(12) United States Patent
Elston, III et al.

(10) Patent No.: US 8,426,777 B2
(45) Date of Patent: Apr. 23, 2013

(54) OVEN CONTROL UTILIZING DATA-DRIVEN LOGIC

(75) Inventors: Wallace J. Elston, III, Paw Paw, MI (US); Anthony E. Jenkins, Ooltewah, TN (US); Patrick J. Marciniak, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 328 days.

(21) Appl. No.: 12/783,047

(22) Filed: May 19, 2010

(65) Prior Publication Data

US 2011/0284518 A1 Nov. 24, 2011

(51) Int. Cl.
*A21B 1/00* (2006.01)

(52) U.S. Cl.
USPC .............................. 219/391; 219/482; 99/325

(58) Field of Classification Search .................. 219/391, 219/482, 510, 486, 490, 492, 484, 489, 483; 99/324 I, 325, 331, 333, 338
See application file for complete search history.

(56) References Cited

U.S. PATENT DOCUMENTS

| | | | | |
|---|---|---|---|---|
| 5,438,180 | A | 8/1995 | Eisenbrandt et al. | |
| 5,966,516 | A * | 10/1999 | De Palma et al. | 703/1 |
| 6,157,008 | A | 12/2000 | Brown et al. | |
| 6,163,017 | A | 12/2000 | Corda et al. | |
| 6,255,630 | B1 | 7/2001 | Barnes et al. | |
| 6,570,136 | B1 | 5/2003 | Lockwood et al. | |
| 6,734,403 | B2 | 5/2004 | Baker et al. | |
| 6,831,254 | B2 | 12/2004 | Barritt | |
| 7,112,767 | B2 | 9/2006 | Lee | |
| 7,126,088 | B2 | 10/2006 | Horton et al. | |
| 7,368,686 | B2 | 5/2008 | Etheredge et al. | |
| 7,554,061 | B2 | 6/2009 | Ruther et al. | |
| 2005/0274711 | A1 | 12/2005 | Boyer | |
| 2007/0288192 | A1 | 12/2007 | Imgram et al. | |
| 2009/0136640 | A1 * | 5/2009 | Embury et al. | 426/510 |

FOREIGN PATENT DOCUMENTS

| | | | |
|---|---|---|---|
| DE | 4317624 | C1 | 6/1994 |
| EP | 0576146 | A1 | 12/1993 |
| EP | 1501336 | A1 | 1/2005 |
| EP | 2085700 | A2 | 8/2009 |
| WO | 2008066267 | A1 | 6/2008 |
| WO | 2008/116532 | A1 | 10/2008 |
| WO | 2008118999 | A2 | 10/2008 |

OTHER PUBLICATIONS

S. Kawaguchi et al., "Data driven logic: a programming method using data flow diagrams" Proceedings of the 1999 IEEE Midnight-Sun Workshop on Soft Computing Methods in Industrial Applications (1999) pp. 46-51.

* cited by examiner

*Primary Examiner* — Julio J Maldonado
*Assistant Examiner* — Robert Bachner
(74) *Attorney, Agent, or Firm* — Jason S. Burnette

(57) ABSTRACT

A method of controlling a cooking appliance is disclosed which includes receiving an input corresponding to a staged cooking function, retrieving a preselected parameter set from a data library, the preselected parameter set defining the staged cooking function and including a first heating element behavior parameter and a first temperature parameter, selecting a first heating element behavior from a control library based upon the first heating element behavior parameter, and operating one or more heating elements according to the first heating element behavior and the first temperature parameter. An oven and a tangible, machine-readable medium are also disclosed.

11 Claims, 7 Drawing Sheets

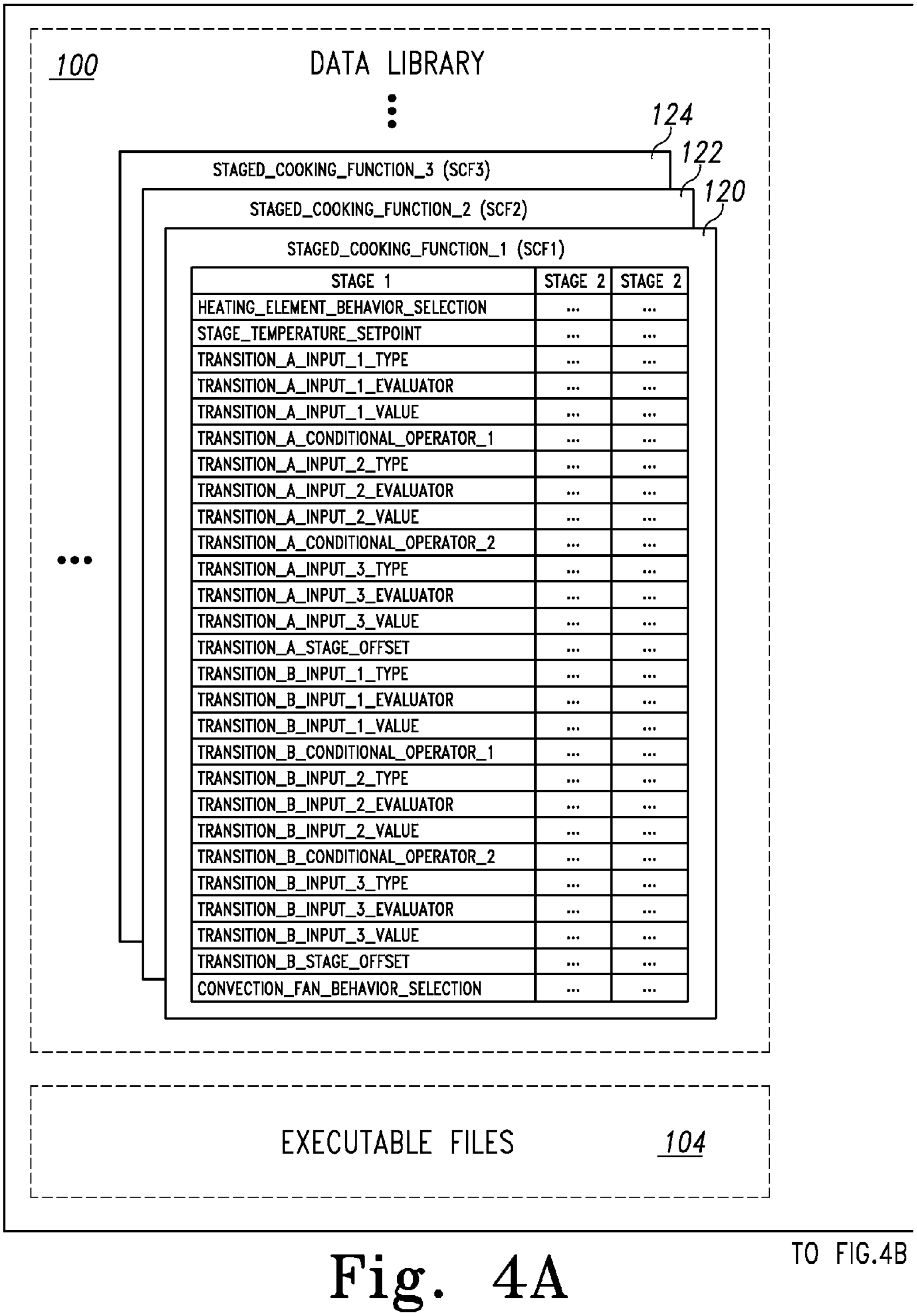

| STAGE 1 | STAGE 2 | STAGE 2 |
|---|---|---|
| HEATING_ELEMENT_BEHAVIOR_SELECTION | ... | ... |
| STAGE_TEMPERATURE_SETPOINT | ... | ... |
| TRANSITION_A_INPUT_1_TYPE | ... | ... |
| TRANSITION_A_INPUT_1_EVALUATOR | ... | ... |
| TRANSITION_A_INPUT_1_VALUE | ... | ... |
| TRANSITION_A_CONDITIONAL_OPERATOR_1 | ... | ... |
| TRANSITION_A_INPUT_2_TYPE | ... | ... |
| TRANSITION_A_INPUT_2_EVALUATOR | ... | ... |
| TRANSITION_A_INPUT_2_VALUE | ... | ... |
| TRANSITION_A_CONDITIONAL_OPERATOR_2 | ... | ... |
| TRANSITION_A_INPUT_3_TYPE | ... | ... |
| TRANSITION_A_INPUT_3_EVALUATOR | ... | ... |
| TRANSITION_A_INPUT_3_VALUE | ... | ... |
| TRANSITION_A_STAGE_OFFSET | ... | ... |
| TRANSITION_B_INPUT_1_TYPE | ... | ... |
| TRANSITION_B_INPUT_1_EVALUATOR | ... | ... |
| TRANSITION_B_INPUT_1_VALUE | ... | ... |
| TRANSITION_B_CONDITIONAL_OPERATOR_1 | ... | ... |
| TRANSITION_B_INPUT_2_TYPE | ... | ... |
| TRANSITION_B_INPUT_2_EVALUATOR | ... | ... |
| TRANSITION_B_INPUT_2_VALUE | ... | ... |
| TRANSITION_B_CONDITIONAL_OPERATOR_2 | ... | ... |
| TRANSITION_B_INPUT_3_TYPE | ... | ... |
| TRANSITION_B_INPUT_3_EVALUATOR | ... | ... |
| TRANSITION_B_INPUT_3_VALUE | ... | ... |
| TRANSITION_B_STAGE_OFFSET | ... | ... |
| CONVECTION_FAN_BEHAVIOR_SELECTION | ... | ... |

Fig. 4A

TO FIG.4B

OVEN CONTROL UTILIZING DATA-DRIVEN LOGIC

TECHNICAL FIELD

The present disclosure relates generally to methods of controlling cooking appliances. More particularly, the present disclosure relates to methods of implementing staged cooking functions in cooking appliances using data-driven logic.

BACKGROUND

A cooking appliance is used to cook meals and other foodstuffs within an oven or on a cooktop. Cooking appliances often include various electronic controls used to operate the heating elements of the cooking appliance. A typical, electronically controlled oven allows a user to select a basic operating mode (e.g., bake or broil) and a desired temperature. Some ovens further allow the user to specify a time duration, and possibly a time delay, for the cooking operation. These and other cooking operations are typically hard-coded into the electronic controls of the cooking appliance. While adequate for some foodstuffs, this method of controlling cooking operation is not readily adaptable to other food items, such as baked goods and the like.

SUMMARY

According to one aspect, a method of controlling a cooking appliance includes receiving an input corresponding to a staged cooking function, retrieving a preselected parameter set from a data library, the preselected parameter set defining the staged cooking function and including a first heating element behavior parameter and a first temperature parameter, selecting a first heating element behavior from a control library based upon the first heating element behavior parameter, and operating one or more heating elements according to the first heating element behavior and the first temperature parameter. Selecting the first heating element behavior may include selecting a proportional-integral-derivative algorithm which uses the first temperature parameter as a setpoint.

In some embodiments, the method may further include determining, while operating the one or more heating elements according to the first heating element behavior, whether a first event has occurred, selecting a second heating element behavior from the control library based upon a second heating element behavior parameter, in response to determining that the first event has occurred, and operating the one or more heating elements according to the second heating element behavior and a second temperature parameter. In such embodiments, the preselected parameter set also includes the second heating element behavior parameter, the second temperature parameter, and one or more parameters defining the first event.

In some embodiments, determining whether the first event has occurred may include selecting an input signal based upon an input type parameter, the input signal indicating a condition of the cooking appliance, and comparing the input signal to an input value parameter using an input evaluator parameter. In such embodiments, the preselected parameter set also includes the input type parameter, the input value parameter, and the input evaluator parameter. Selecting the input signal may include selecting one of a clock signal, a cavity temperature signal, a cavity humidity signal, a meat probe temperature signal, and a door position signal.

In other embodiments, determining whether the first event has occurred may include selecting a plurality of input signals based upon a plurality of input type parameters, each input signal indicating a condition of the cooking appliance, comparing each input signal to one of a plurality of input value parameters using one of a plurality of input evaluator parameters to generate a plurality of Boolean values, and evaluating a Boolean expression containing the plurality of Boolean values and one or more conditional operator parameters. In such embodiments, the preselected parameter set also includes the plurality of input type parameters, the plurality of input value parameters, the plurality of input evaluator parameters, and the one or more conditional operator parameters.

In some embodiments, the method may further include determining, while operating the one or more heating elements according to the first heating element behavior, whether a second event has occurred, selecting a third heating element behavior from the control library based upon a third heating element behavior parameter, in response to determining that the second event has occurred, and operating the one or more heating elements according to the third heating element behavior and a third temperature parameter. In such embodiments, the preselected parameter set also includes the third heating element behavior parameter, the third temperature parameter, and one or more parameters defining the second event.

In still other embodiments, the method may further include selecting a convection fan behavior from the control library based upon a convection fan behavior parameter, the convection fan behavior parameter being included in the preselected parameter set, and operating one or more convection fans according to the convection fan behavior, while operating the one or more heating elements according to the first heating element behavior.

According to another aspect, an oven may include one or more heating elements, a memory device storing a control library and a data library, wherein the control library includes a plurality of heating element behaviors and the data library includes at least one preselected parameter set having a first heating element behavior parameter and a first temperature parameter, and an electronic control unit configured to (i) access the preselected parameter set, (ii) select a first heating element behavior from the control library based upon the first heating element behavior parameter, and (iii) operate the one or more heating elements according to the first heating element behavior and the first temperature parameter.

In some embodiments, the at least one preselected parameter set may further include a second heating element behavior parameter, a second temperature parameter, and one or more parameters defining an event. In such embodiments, the electronic control unit may be further configured to (i) determine whether the event has occurred, (ii) select a second heating element behavior from the control library based upon the second heating element behavior parameter, in response to determining that the first event has occurred, and (iii) operate the one or more heating elements according to the second heating element behavior and the second temperature parameter.

In some embodiments, the oven may further include a temperature sensor generating a temperature signal and a timer generating a clock signal. In such embodiments, the at least one preselected parameter set may further include an input type parameter, an input value parameter, and an input evaluator parameter and the electronic control unit may be configured to determine whether the event has occurred by (i) selecting one of the temperature signal and the clock input signal based upon the input type parameter and (ii) comparing the selected signal to the input value parameter using the input evaluator parameter.

According to yet another aspect, a tangible, machine-readable medium may include a control library including a plurality of heating element behaviors, a data library including at least one preselected parameter set, the preselected parameter set defining a staged cooking function and including a first heating element behavior parameter and a first temperature parameter, and one or more executable files including a plurality of instructions that, in response to being executed, result in a processor (i) reading the preselected parameter set, (ii) selecting a first heating element behavior from the control library based upon the first heating element behavior parameter, and (iii) generating one or more heating element control signals according to the first heating element behavior and the first temperature parameter. The plurality of heating element behaviors may include a number of proportional-integral-derivative algorithms which each use a temperature parameter as a setpoint.

In some embodiments, the preselected parameter set may further include a second heating element behavior parameter, a second temperature parameter, and one or more parameters defining a first event. In such embodiments, the one or more executable files may further include a plurality of instructions that, in response to being executed, result in the processor (i) determining whether the first event has occurred, (ii) selecting a second heating element behavior from the control library based upon the second heating element behavior parameter, in response to determining that the first event has occurred, and (iii) generating one or more heating element control signals according to the second heating element behavior and the second temperature parameter.

In some embodiments, the preselected parameter set may further include an input type parameter, an input value parameter, and an input evaluator parameter. In such embodiments, the instructions that result in the processor determining whether the first event has occurred may include a plurality of instructions that, in response to being executed, result in the processor (i) selecting an input signal based upon the input type parameter, and (ii) comparing the input signal to the input value parameter using the input evaluator parameter. The instructions that result in the processor selecting an input signal may include instructions that, in response to being executed, result in the processor selecting one of a clock signal, a cavity temperature signal, a cavity humidity signal, a meat probe temperature signal, and a door position signal.

In other embodiments, the preselected parameter set may further include a plurality of input type parameters, a plurality of input value parameters, a plurality of input evaluator parameters, and one or more conditional operator parameters. In such embodiments, the instructions that result in the processor determining whether the first event has occurred may include a plurality of instructions that, in response to being executed, result in the processor (i) selecting a plurality of input signals based upon the plurality of input type parameters, (ii) comparing each input signal to one of the plurality of input value parameters using one of the plurality of input evaluator parameters to generate a plurality of Boolean values, and (iii) evaluating a Boolean expression containing the plurality of Boolean values and the one or more conditional operator parameters.

In some embodiments, the preselected parameter set may further include a third heating element behavior parameter, a third temperature parameter, and one or more parameters defining a second event. In such embodiments, the one or more executable files may further include a plurality of instructions that, in response to being executed, result in the processor (i) determining whether the second event has occurred, while determining whether the first event has occurred, (ii) selecting a third heating element behavior from the control library based upon the third heating element behavior parameter, in response to determining that the second event has occurred, and (iii) generating one or more heating element control signals according to the third heating element behavior and the third temperature parameter.

In still other embodiments, the control library may further include a plurality of convection fan behaviors, the preselected parameter set may further include a convection fan behavior parameter, and the one or more executable files may further include a plurality of instructions that, in response to being executed, result in the processor (i) selecting a convection fan behavior from the control library based upon the convection fan behavior parameter, and (ii) generating one or more convection fan control signals according to the convection fan behavior.

BRIEF DESCRIPTION OF THE DRAWINGS

The detailed description particularly refers to the following figures, in which:

FIGS. 4A-B are a diagram illustrating several exemplary data structures that may be stored in a memory device of the cooking appliance of FIG. 1;

DETAILED DESCRIPTION OF THE DRAWINGS

Figure 1:
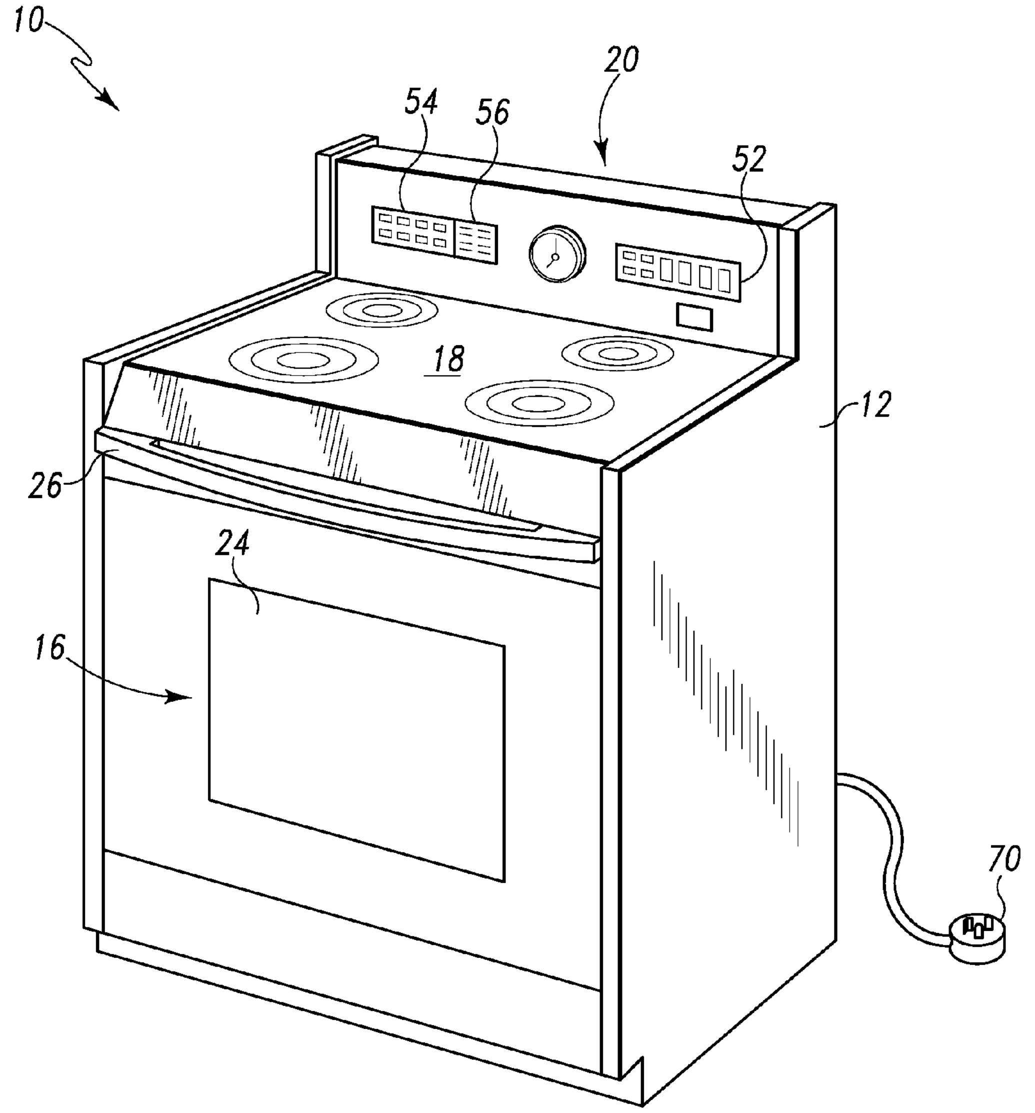
FIG. 1 is a perspective view of an exemplary cooking appliance.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but, on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Embodiments of the disclosed systems and methods may be implemented in hardware, firmware, software, or any combination thereof. Embodiments of the disclosed systems and methods implemented in a cooking appliance may include one or more point-to-point interconnects between components and/or one or more bus-based interconnects between components. Embodiments of the disclosed systems and methods may also be implemented as instructions stored on a tangible, machine-readable medium, which may be read and executed by one or more processors. A tangible, machine-readable medium may include any mechanism for storing or transmitting information in a form readable by a machine (e.g., a processor). For example, a tangible, machine-readable medium may include read only memory (ROM), random access memory (RAM), magnetic disk storage, optical storage, flash memory, and/or other types of memory devices.

Figure 2:
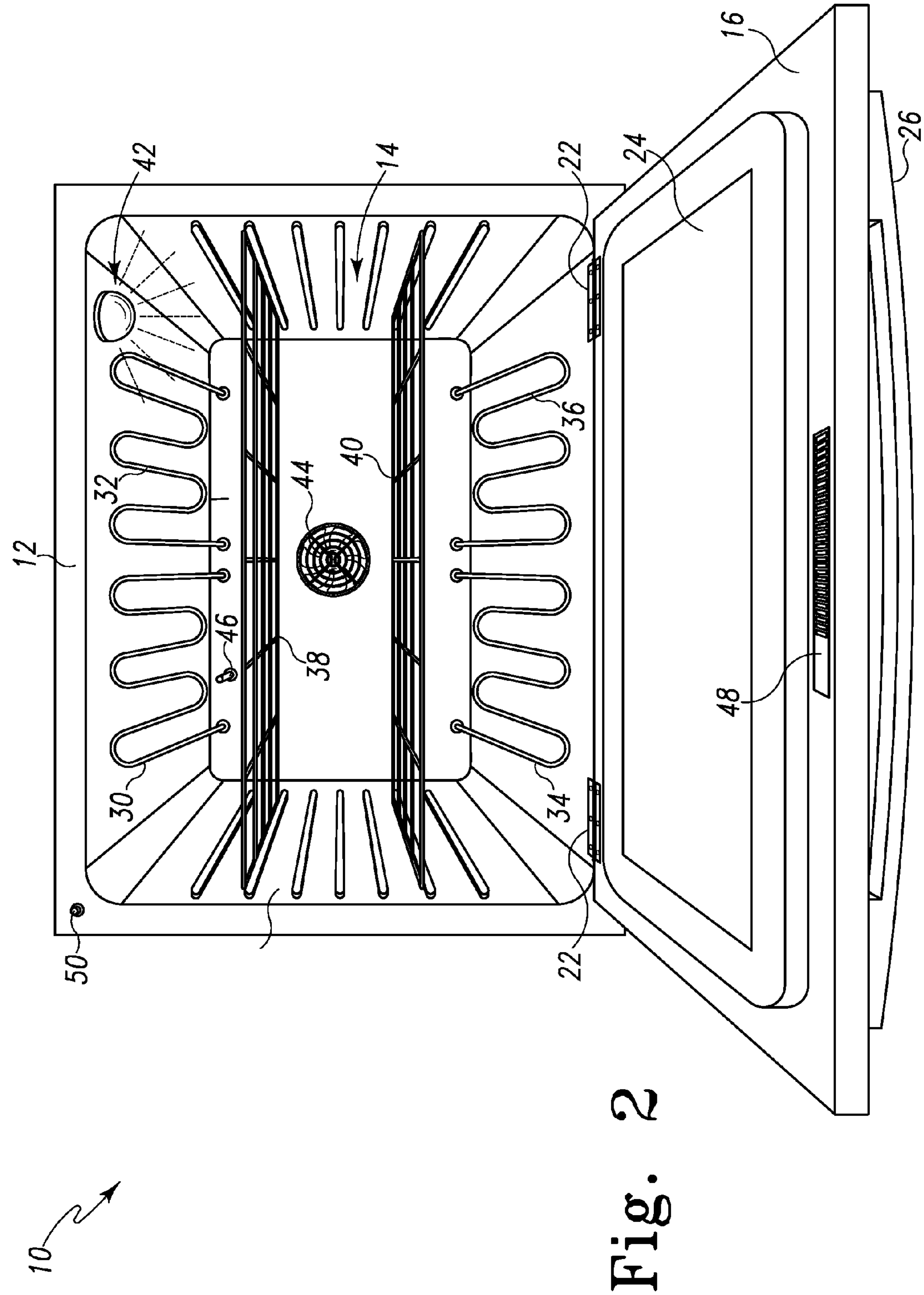
FIG. 2 is a partial perspective view of the cooking appliance of FIG. 1, with the front door open.
Figure 3:
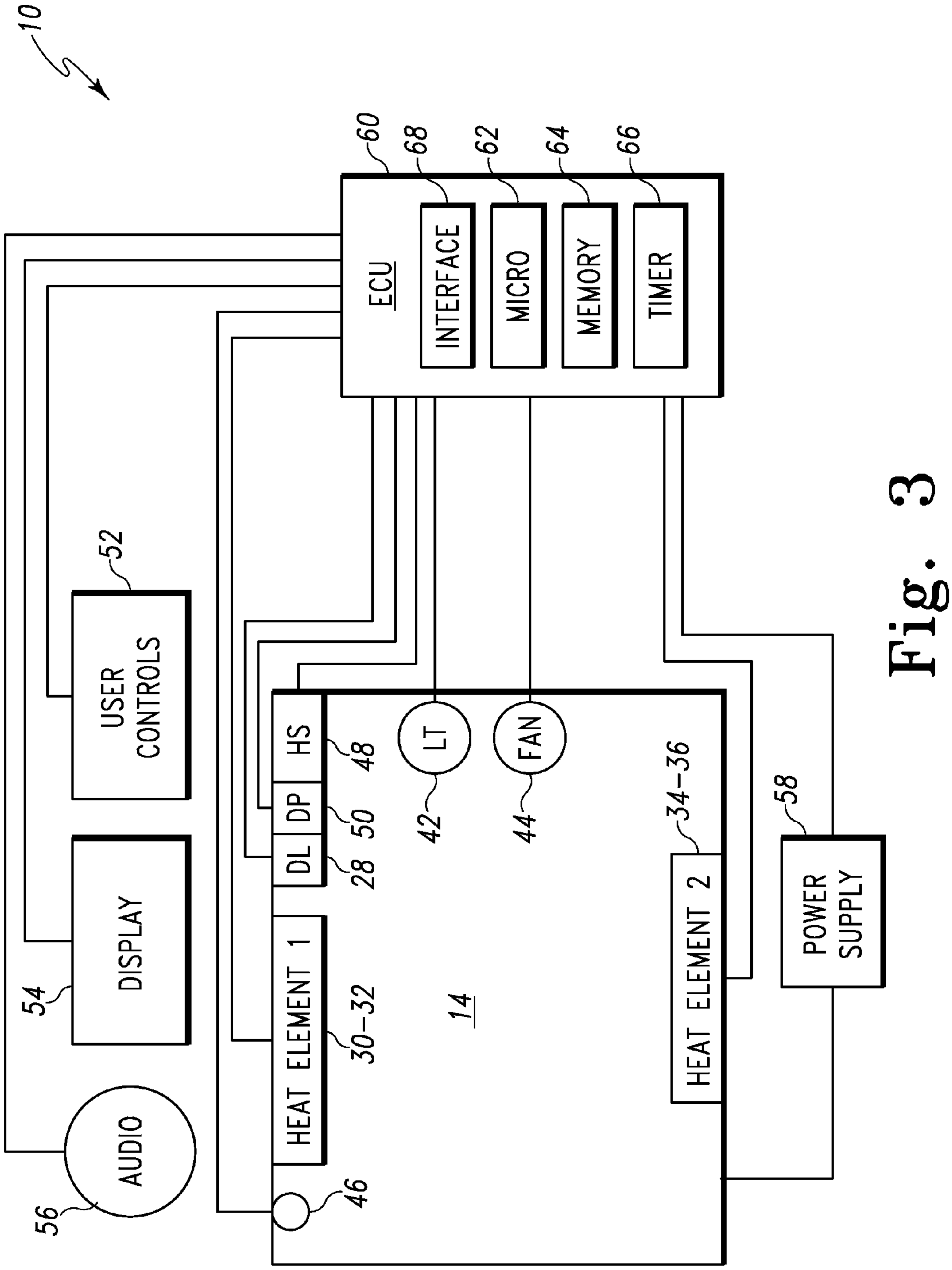
FIG. 3 is a schematic block diagram illustrating electrical connections between several components of the cooking appliance of FIG. 1.

Referring generally now to FIGS. 1-3, there is shown an exemplary cooking appliance 10 that is programmable to implement staged cooking functions using data-driven logic. The cooking appliance 10 is illustratively embodied as an oven 10 having a housing 12, a door 16, a cooktop 18, and a user console 20. Similar or identical components are labeled using the same reference numerals in FIGS. 1-3 and throughout this disclosure. The data-driven programming and operation of the cooking appliance 10 are described herein with reference to FIGS. 4-6.

As shown in FIG. 2, the housing 12 of the oven 10 generally defines an interior cavity 14 into which a user places meals and other foodstuffs for cooking. A door 16 is pivotably coupled to the lower front edge of the housing 12 by a number of hinges 22 or similar coupling mechanisms. When the door 16 is closed, user access to the cavity 14 is prevented, whereas user access to the cavity 14 is permitted when the door 16 is open. The door 16 also functions to seal the oven 10 so that heat does not escape the cavity 14 of the oven 10 during a cooking operation. The door 16 includes a window 24, through which the contents of the cavity 14 may be viewed, and a handle 26, which facilitates opening and closing of the door 16. The handle 26 may be equipped with a latch (not shown) to releasably secure the door 16 to the housing 12.

The oven 10 includes several heating elements 30-36 positioned to heat the cavity 14 and, hence, foodstuffs placed therein. Illustratively, two heating elements 30, 32 are located adjacent the top wall of cavity 14 and two heating elements 34, 36 are located adjacent the bottom wall of the cavity 14. In some embodiments, the heating elements 30-36 may be located outside the cavity 14 (e.g., the heating elements 34, 36 may be located below the bottom wall of the cavity 14). In the embodiment shown in FIG. 2, the heating elements 30, 32 are configured as broiling elements (used to broil or "top brown" food), while the heating elements 34, 36 are configured as baking elements (used to bake food). Typically, the heating elements 30, 32 have a higher wattage (e.g., about 40% more wattage) than the heating elements 34, 36. It will be appreciated that, although the heating elements 30-36 are illustrated as resistive heating elements, a "heating element" as used herein contemplates any source of heat that might be used in a cooking appliance, including, but not limited to, gas burners, steam, convention air, microwave, and infrared heating elements.

A number of oven racks 38, 40 are positioned to support footstuffs in the cavity 14 of the oven 10. The oven racks 38, 40 are spaced from the heating elements 30-36 and supported by the side walls of the cavity 14. An oven light 42 in the cavity 14 may be illuminated to allow better viewing of the contents of the oven 10 through the window 24. A convection fan 44 is positioned in the rear wall of the cavity 14. The convection fan 44 may operate at three speeds (i.e. "off," low, and high) and may be used to circulate air in the cavity 14 during a convection operation of the oven 10. In some embodiments, the oven 10 may include multiple convection fans 44 (e.g., a lower fan and an upper fan) capable of being independently controlled.

A number of sensors and/or switches are also located in or near the cavity 14 for sensing various conditions of the oven 10. A temperature sensor 46 is supported by the rear wall of the cavity 14. The temperature sensor 46 periodically senses the ambient temperature in the cavity 14 and outputs temperature signals indicative thereof. In the illustrative embodiment, the temperature sensor 46 is a resistive sensor, such as a platinum Resistance Temperature Detector (RTD) sensor 46, although any suitable type of temperature sensor may be used in the oven 10. A humidity sensor 48 is illustratively located in a vent of the door 16. The humidity sensor 48 periodically senses the humidity in the cavity 14 and outputs humidity signals indicative thereof.

The oven 10 also includes a door position sensor 50. The door position sensor 50 senses when the door 16 is closed, i.e. flush against the front of the housing 12, and outputs a door signal indicative of the status of the door 16. In the illustrative embodiment, the door position sensor 50 is an electrical binary switch that closes when the door 16 is closed. When the handle 26 is equipped with a latch, the oven 10 may also include a latch sensor 28 (not shown in FIG. 2) which outputs a latch signal indicating when the door 16 is secured to the housing 12. It will be appreciated that the oven 10 may include additional sensors known to those of skill in the art, including, but not limited to, a meat probe temperature sensor, a convection fan speed sensor (e.g., a Hall-effect sensor), and a voltage or current sensor (to measure the voltage or current of a heating element 30-36, for example).

The user console 20 supports various user interface components of the oven 10. The user console 20 includes several user buttons 52 which generate input signals when manipulated by a user. These user buttons 52 may take the form of tactile buttons, keys, membrane switches, toggle switches, dials, slides, touch screens, or other suitable input mechanisms. The user console 20 also supports a display 54 and an audio annunciator (e.g., a speaker) 56. The display 54 may provide a variety of lights, text messages, graphical icons, and other indicators to inform the user of the status of the oven 10. The audio annunciator 56 outputs an audible signal (e.g., a "beep") to alert the user to the status of the oven 10 or to prompt the user to take an action relating to operation of the oven 10.

The oven 10 also includes an electronic control unit (ECU or "controller") 60. The controller 60 may be mounted in the user console 20, or it may be installed at any other suitable location within the oven 10. As shown in FIG. 3, the controller 60 is electrically coupled to each of the various electronic and electromechanical components of the oven 10, including the heating elements 30-36, the oven light 42, the convection fan 44, the temperature sensor 46, the humidity sensor 48, the door position sensor 50, the latch sensor 28, the user buttons 52, the display 54, the audio annunciator 56, and a power supply 58. The controller 60 is, in essence, the master computer responsible for interpreting electrical signals sent by sensors associated with the oven 10, for determining when various operations of the oven 10 should be performed, and for activating or energizing electronically-controlled components associated with the oven 10, amongst many other things. In particular, as will be described in more detail below with reference to FIGS. 4-6, the controller 60 is operable to control the components of the oven 10 using data-driven logic to implement staged cooking functions.

To do so, the controller 60 includes a number of electronic components commonly associated with electronic units utilized in the control of electromechanical systems. For example, the controller 60 may include, amongst other components customarily included in such devices, a processor (e.g., a microprocessor) 62, a memory device 64, and a timer 66. The memory device 64 may be illustratively embodied as a programmable read-only memory device ("PROM"), including erasable PROM's (EPROM's or EEPROM's). The memory device 64 is provided to store, amongst other things, instructions in the form of, for example, a software routine (or routines) which, when executed by the microprocessor 62, allows the controller 60 to control operation of the oven 10. The timer 66 provides a clock signal which may be used by the microprocessor 62 to synchronize various events and mark the passage of time.

The controller 60 also includes an analog interface circuit 68. The analog interface circuit 68 converts the output signals from various sensors (e.g., the temperature sensor 46) into signals which are suitable for presentation to an input of the microprocessor 62. In particular, the analog interface circuit 68, by use of an analog-to-digital (A/D) converter (not shown) or the like, converts the analog signals generated by the sensors into digital signals for use by the microprocessor 62. It should be appreciated that the A/D converter may be embodied as a discrete device or number of devices, or may be integrated into the microprocessor 62. It should also be appreciated that if any one or more of the sensors associated with the oven 10 generate a digital output signal, the analog interface circuit 68 may be bypassed.

Similarly, the analog interface circuit 68 converts signals from the microprocessor 62 into output signals which are suitable for presentation to the electrically-controlled components associated with the oven 10 (e.g., the heating elements 30-36). In particular, the analog interface circuit 68, by use of a digital-to-analog (D/A) converter (not shown) or the like, converts the digital signals generated by the microprocessor 62 into analog signals for use by the electronically-controlled components associated with the oven 10. It should be appreciated that, similar to the A/D converter described above, the D/A converter may be embodied as a discrete device or number of devices, or may be integrated into the microprocessor 62. It should also be appreciated that if any one or more of the electronically-controlled components associated with the oven 10 operate on a digital input signal, the analog interface circuit 68 may be bypassed.

Thus, the controller 60 may control operation of the heating elements 30-36 and the convection fan 44 to implement staged cooking functions in the oven 10. In particular, the controller 60 executes a routine including, amongst other things, a control scheme in which the controller 60 monitors outputs of the sensors associated with the oven 10 to control the inputs to the electronically-controlled components associated therewith. To do so, the controller 60 communicates with the sensors associated with the oven 10 to determine, amongst numerous other things, the temperature and humidity levels in the cavity 14 and/or the state of the door 16. Armed with this data, the controller 60 performs numerous calculations, either continuously or intermittently, including looking up values in programmed tables, in order to execute algorithms to perform such functions as controlling the heating elements 30-36 to maintain a desired temperature in the cavity 14, by way of example.

A power supply 58 provides each of the electronic and electromechanical components described above with the appropriate power to perform its operations. Electricity is normally supplied to the power supply 58 by connecting the oven 10 to an external power source (e.g., a wall outlet) by a connector 70. However, the power supply 58 may also access an alternative source of energy, such as an internal battery. This allows the oven 10 to maintain operations even if the external power source becomes unavailable. As will be appreciated by persons of skill in the art, the oven 10 may include elements other than those shown and described above. It should also be understood that the location of many components (i.e., in the cavity 14, in the user console 20, in or on the door 16) may also be altered.

Figure 4B:
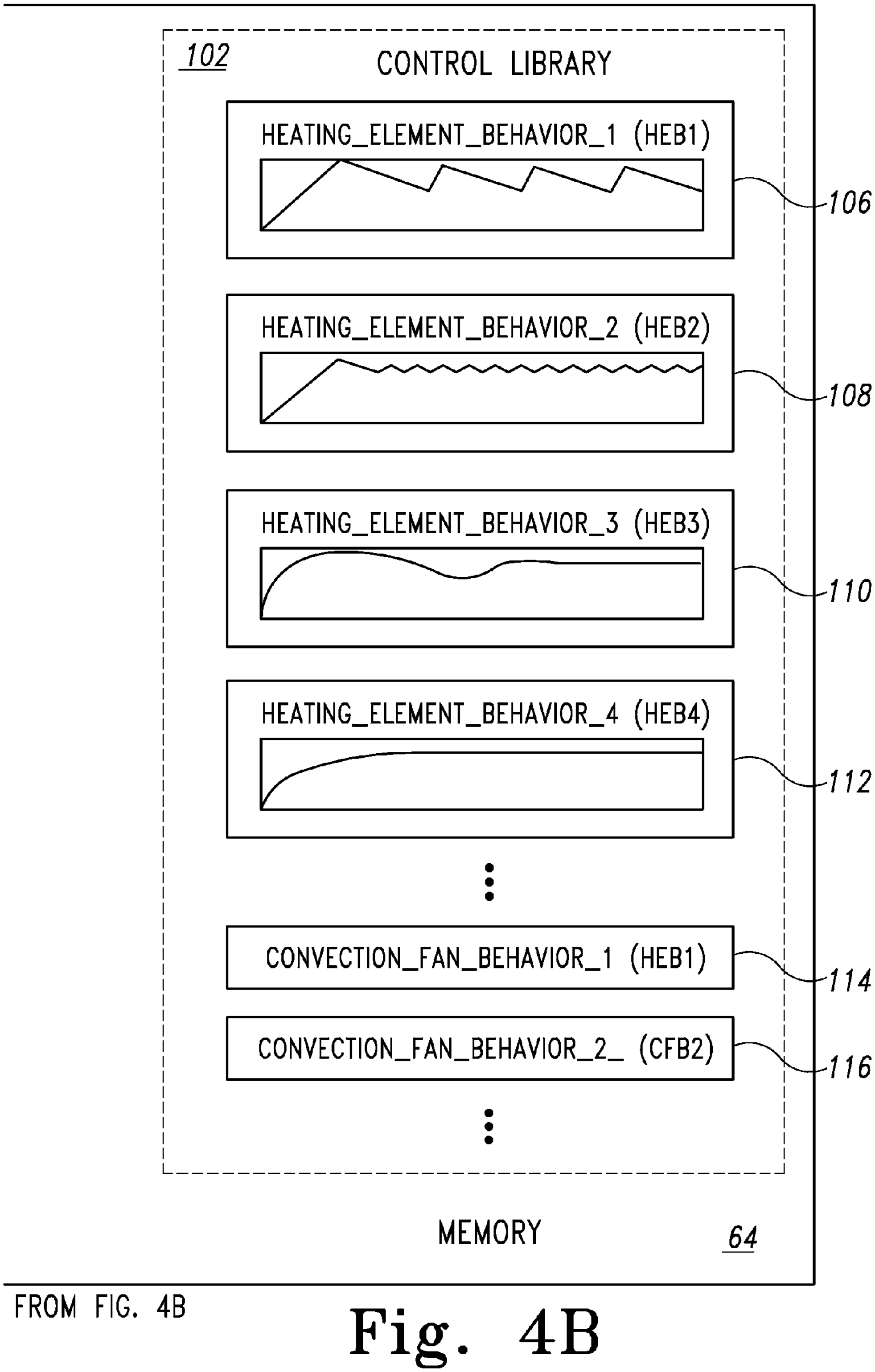

Referring now to FIGS. 4A-B, several exemplary data structures are illustrated that may be stored in the memory device 64 and that may be used by the controller 60 to execute staged cooking functions. The illustrative memory device 64 of FIGS. 4A-B includes a data library 100, a control library 102, and one or more executable files 104. The memory device 64 employs a data-driven programming scheme in which the software code that controls basic operations of the oven 10 is stored separately from the data which defines the specific parameters, including algorithm flow, for each individual staged cooking function. Because the data itself is used to configure the system and to control the algorithm flow, programming or debugging a staged cooking function of the oven 10 merely requires entering or adjusting the values in a data file, rather than coding and compiling source code. In some embodiments, the data library 100 may reside in a distinct file or database that is separate from the file(s) or database(s) containing the control library 102 and the executable files 104. In other embodiments, the data library 100 may reside in the same file or database as the control library 102 and the executable files 104, in a separate portion thereof. It will appreciated that other memory configurations are possible.

The control library 102 contains hard-coded software instructions that are used by the controller 60 to drive the basic operations of the heating elements 30-36 and the convection fan 44. These low-level algorithms are defined as behaviors, including heating element behaviors ("HEB") 106-112 and convection fan behaviors ("CFB") 114, 116. It is contemplated that the control library 102 may include any number of behaviors and may also include behaviors other than those shown in FIG. 4B, such low-level algorithms that control operation of the display 54 and the audio annunciator 56, for example. The behaviors 106-116 which are stored in control library 102 are the building blocks which make up a staged cooking function.

The behaviors 106-116 may implement any known method of controlling the electronic or electromechanical components of the oven 10. For instance, the heating element behaviors may include traditional hysteresis-based algorithms, such as HEB1 106 and HEB2 108, and proportional-integral-derivative (PID) algorithms, such as HEB3 110 and HEB4 112 (FIG. 4B illustrates a graph of heat output versus time for each exemplary HEB). In some embodiments, each HEB 106-112 may also include a load balancing function which coordinates the operation of the heating elements 30-36. Each behavior may be a self-contained control algorithm or may accept one or more variables from a higher-level algorithm. By way of example, each HEB 106-112 may receive a temperature input which provides a setpoint for the behavior. In these embodiments, a selected HEB will drive one or more of the heating elements 30-36 according to its algorithm in an attempt to generate a heat output equal to the desired temperature. Likewise, each CFB 114, 116 cycles the operation of one or more convection fans at various speeds and for various durations.

The data library 100 contains sets of preselected parameters, each of which defines a staged cooking function ("SCF") 120-124. These parameters may be stored in data files, database entries, tables, or any other appropriate data structure. Although three sets of SCF parameters 120-124 are shown in FIG. 4A, it is contemplated that the data library 100 may include any number of preselected parameter sets. Each staged cooking function 120-124 may be associated with a particular meal or food type and may allow the combination and fine-tuning of several heating element and convection fan behaviors 106-116 to achieve improved cooking of that foodstuff. Typically, the appropriate parameters for each SCF 120-124 will be determined and programmed by a manufacturer of the oven 10. It is also contemplated, however, that the oven 10 may allow an end-user to program a new SCF using an appropriate interface.

The staged cooking functions 120-124 are used by the controller 60 to define the flow of the upper-level control algorithm. Each SCF 120-124 may include any number of stages, including one stage or multiple stages. As shown in FIG. 4A, Staged_Cooking_Function_1 (SCF1) 120 illustratively contains three operational stages, each stage being illustratively defined by twenty-seven parameters (the respective functions of which will be described in more detail below). It will be understood that the data structure shown in FIG. 4A is exemplary and that any number of preselected parameters may be used to define each stage of an SCF. Several parameters of each stage (i.e., Heating_Element_Behavior_Selection, Stage_Temperature_Setpoint, and Convection_Fan_Behavior_Selection) determine which behaviors will be called from the control library 102 during that stage. The remainder of the preselected parameters define the events which cause the algorithm to transition from a current stage to a new stage and, thus, control the flow of the upper-level control algorithm defined by the staged cooking function.

Figure 5:
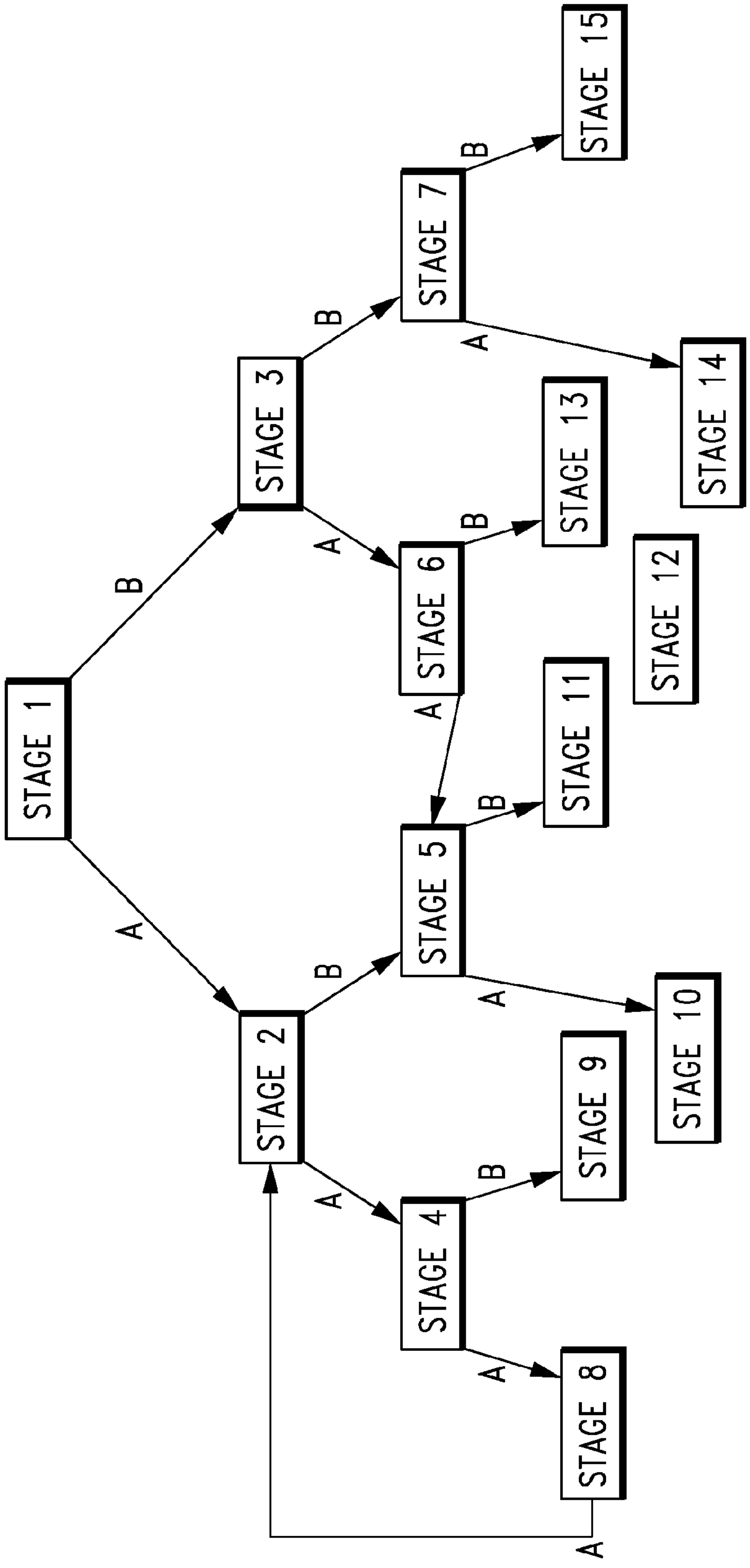
FIG. 5 is a chart illustrating various stage transitions which may be programmed using the data structures of FIGS. 4A-B.

The operation of transitions in a staged cooking function may be understood with reference to FIG. 5. In the illustrative embodiment of FIGS. 4-5, each stage of the SCF may have up to two transitions ("A" and "B") defined by its preselected parameters. Some stages of the SCF may include parameters defining both Transition A and Transition B (e.g., Stages 1-7 in FIG. 5). Other stages of the SCF may include parameters defining only one transition (e.g., Transition A in Stage 8) or may have no transitions defined by their parameters (e.g., Stages 9-15). The availability of two or more transitions per stage allows an SCF to employ branching logic, as shown in FIG. 5.

In the illustrative embodiment, the staged cooking function begins at Stage 1 when the SCF is selected by a user of the oven 10. During Stage 1, the controller 60 will determine whether the event defined by Transition A has occurred. If the event occurs, the Transition_A_Stage_Offset parameter will determine to which stage the SCF proceeds. In FIG. 5, this parameter is programmed as "+1," which causes the SCF to proceed to Stage 2. Simultaneously during Stage 1, the controller 60 will determine whether the event defined by Transition B has occurred. If the event occurs, the Transition_B_Stage_Offset parameter (programmed as "+2" in FIG. 5) will cause the SCF to proceed to Stage 3. Using a negative Stage_Offset parameter (for example, "−6" for the Transition_A_Stage_Offset of Stage 8 in FIG. 5), looping logic can be implemented.

In addition, a combination of branching and looping logic can be created, which may result in divergent paths through the SCF. For instance, the first time through Stage 2, Transition A may be satisfied, and the SCF may proceed to Stage 4. After reaching Stage 8 and returning to Stage 2, however, Transition B may now be satisfied, and the SCF may then proceed to Stage 5. Furthermore, not every available stage need be used in a particular SCF (e.g., Stage 12 in FIG. 5). As will be readily appreciated from FIG. 5 and this discussion, providing two or more transitions per stage creates a substantial number of algorithm programming possibilities.

As mentioned above, each stage of an SCF contains several parameters that determine which behaviors will be called from the control library 102 during that stage. The Heating_Element_Behavior_Selection parameter may be programmed as an integer value that calls a particular heating element behavior, which actually manipulates the heating elements 30-36 (e.g., HEB1 106, HEB2 108, HEB3 110, HEB4 112, etcetera). The Stage_Temperature_Setpoint parameter may be programmed as an integer value that represents either a desired operating temperature for the stage or a desired offset value from some nominal temperature. The Convection_Fan_Behavior_Selection may be programmed as an integer value that calls a particular convection fan behavior, which actually manipulates the convection fan 44 (e.g., CFB1 114, CFB2 116, etcetera). It should be noted that, although each stage allows these behaviors to be called, this is not necessary. A stage may also be used simply to make a decision on how to proceed, without actually causing any changes to the operation of the heating elements 30-36 or the convection fan 44 from the previous stage.

The transitions away from each stage of an SCF are also defined by several preselected parameters of that stage. Each transition is illustratively defined by at least an input type, an input evaluator, and an input value. The Transition_A_Input_1_Type parameter may be programmed as an integer value corresponding to a particular input signal to be evaluated by the controller 60. By way of illustrative example, the input type parameter may point to the temperature sensor 46, the humidity sensor 48, the door position sensor 50, the latch sensor 28, the user buttons 52, the timer 66, a meat probe temperature sensor, a voltage sensor, a current sensor, a Hall-effect sensor, other timers, or even flags set by other software modules. The Transition_A_Input_1_Value parameter may be programmed as an integer value that may be used for comparison to the selected input signal. The Transition_A_Input_1_Evaluator parameter may be programmed as an integer value corresponding to the appropriate comparison to be performed by the controller 60 (e.g., a "less than" comparison, a "greater than" comparison, an "equal to" comparison, etc.).

In the illustrative embodiment shown in FIG. 4A, up to three comparisons of three input signals to three values may be made for each transition (both "A" and "B") in each stage. In addition, the outputs of these three comparisons (expressed as Boolean values) may be joined with Boolean operators to form a Boolean expression that may be evaluated by the controller 60 to determine if the conditions of either Transition A or Transition B have been met. The Transition_A_Conditional_Operator_1 parameter (and the other conditional operator parameters) may be programmed as an integer value corresponding to the appropriate Boolean operator (e.g., "AND," "OR," etcetera). Finally, as mentioned above, the Transition_A_Stage_Offset and Transition_B_Stage_Offset may be programmed as positive or negative integer values corresponding to the number of stages to advance or regress if either Transition A or Transition B has been met, respectively.

Thus, Transition A and Transition B may be programmed to correspond to a large variety of events. For example, in the illustrative embodiment, the conditional phrase, “If Meat Probe Temperature is greater than or equal to 145 AND RTD Temperature is less than 250 OR Stage Timer is greater than or equal to 300, go forward 3 stages,” may be programmed as Transition A using the following integer values shown in Table 1 as preselected parameters.

TABLE 1

| Equivalent Phrase | Parameter | Value |
|---|---|---|
| Meat Probe Temperature | Transition_A_Input_1_Type | 2 |
| is greater than or equal to | Transition_A_Input_1_Evaluator | 2 |
| 145 | Transition_A_Input_1_Value | 145 |
| AND | Transition_A_Conditional_Operator_1 | 2 |
| RTD Temperature | Transition_A_Input_2_Type | 1 |
| is less than | Transition_A_Input_2_Evaluator | 1 |
| 250 | Transition_A_Input_2_Value | 250 |
| OR | Transition_A_Conditional_Operator_2 | 1 |
| Stage Timer | Transition_A_Input_3_Type | 3 |
| is greater than or equal to | Transition_A_Input_3_Evaluator | 2 |
| 300 | Transition_A_Input_3_Value | 300 |
| go forward 3 stages. | Transition_A_Stage_Offset | 3 |

Figure 6:
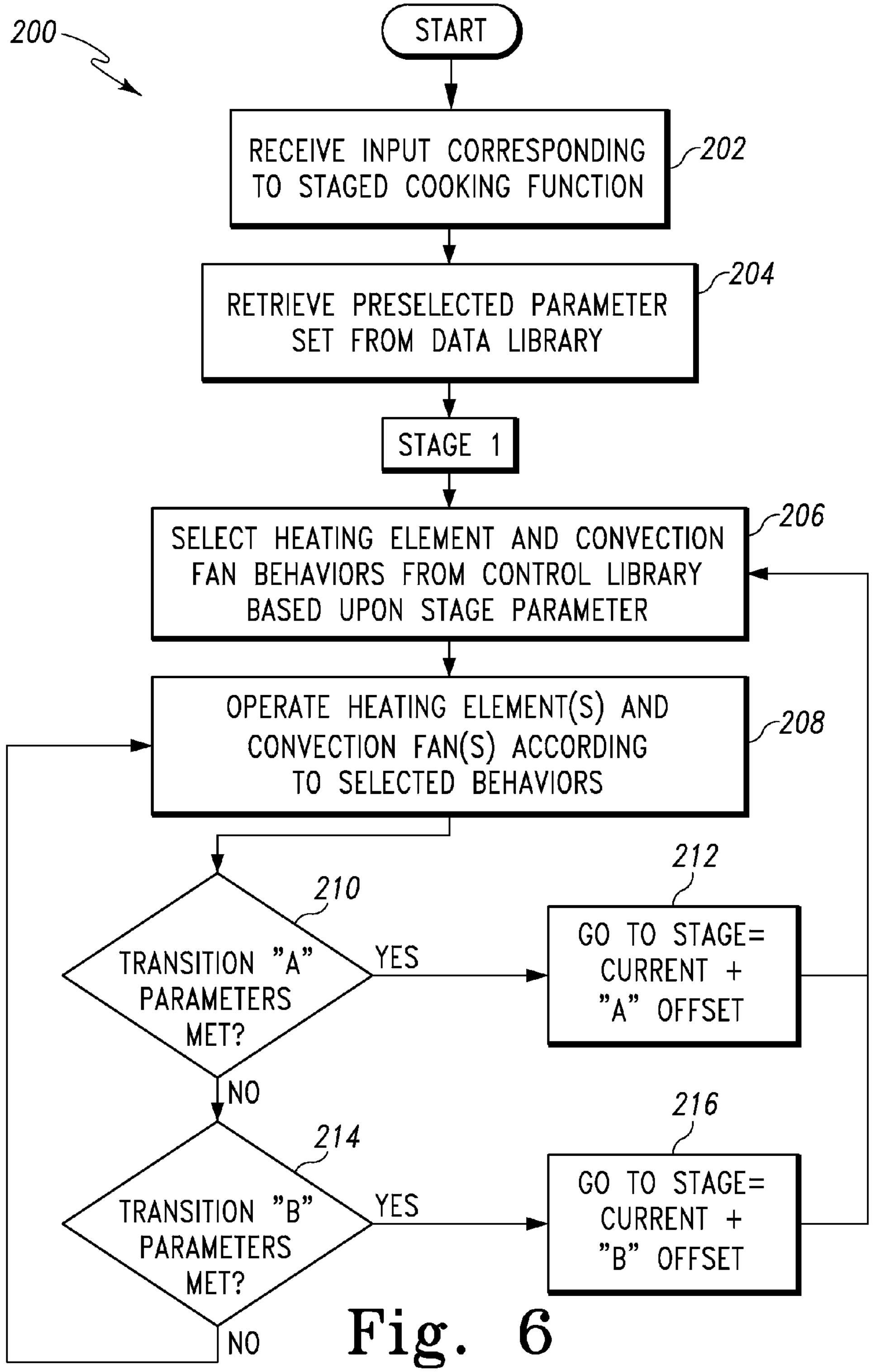
FIG. 6 is a simplified flow diagram illustrating a method of controlling the cooking appliance of FIG. 1.

Referring now to FIG. 6, an illustrative embodiment of a method of operating the oven 10 of FIGS. 1-3 (utilizing the data structures of FIGS. 4A-B) is illustrated as a simplified flow diagram. The process 200 illustrated in FIG. 6 may be performed, by way of example, by the microprocessor 62 of the controller 60 when executing the one or more executable files 104 stored in the memory device 64. The executable files 104 may include a plurality of instructions that, in response to being executed, result in the microprocessor 62 performing some or all of the process steps 202-216 shown in FIG. 6.

The process 200 begins with process step 202, in which the controller 60 receives an input signal indicating that a staged cooking function of the oven 10 has been selected. For instance, the received input signal may correspond to an SCF optimized for cooking a particular meal or food type (e.g., SCF1 120). In some embodiments, the input signal corresponding to the staged cooking function may be transmitted to the controller 60 from the user console 20 in response to a user’s selection of one of the user buttons 52.

After process step 202, the process 200 proceeds to process step 204, in which the controller 60 retrieves a preselected parameter set from the data library 100 which defines the selected staged cooking function (e.g., defining SCF1 120). This preselected parameter set will typically include at least a heating element behavior parameter and a temperature parameter for the first stage of the SCF. The preselected parameter set may also include a convection fan behavior parameter for the first stage of the SCF. In some embodiments, the preselected parameter set may also include one or more parameters defining a Transition A event for one or more stages and/or one or more parameters defining a Transition B event for one or more stages, including one or more input type parameters, one or more input value parameters, one or more input evaluator parameters, one or more conditional operator parameters, and one or more stage offset parameters, as described above. In other embodiments, the preselected parameter set may also include one or more heating element behavior parameters, one or more temperature parameters, and one or more convection fan behavior parameters for second or subsequent stages of the SCF.

After process step 204, the process 200 implements the selected staged cooking function, beginning with Stage 1, by proceeding to process step 206. In process step 206, the controller 60 selects a heating element behavior 106-112 from the control library 102. The controller 60 selects the appropriate HEB 106-112 based upon the value of the heating element behavior parameter specified for the current stage (e.g., Stage 1) in the preselected parameter set. In some embodiments, where a convection fan behavior parameter is specified for the current stage, the controller 60 may also select a convection fan behavior 114-116 from the control library 102 in process step 206. The controller 60 selects the appropriate CFB 114-116 based upon the value of the convention behavior parameter specified for the current stage in the preselected parameter set.

After process step 206, the process 200 proceeds to process step 208, in which the controller 60 operates one or more of the heating elements 30-36 according to the selected heating element behavior and the temperature parameter specified for the current stage in the preselected parameter set. For instance, the controller 60 may employ the algorithm stored in the selected HEB (e.g., a PID algorithm), using the temperature parameter as a setpoint, to generate one or more heating element control signals that are used to drive the heating elements 30-36. In some embodiments, the controller 60 may also operate one or more convection fans 44 according to the selected convection fan behavior. In such embodiments, the controller 60 may employ the algorithm stored in the selected CFB to generate one or more convection fan control signals that are used to drive the convection fan(s) 44. If no parameters are included in the SCF which define either a Transition A event or a Transition B for the current stage, the process 200 remains at process step 208 until cancelled by a user.

If the retrieved parameter set includes parameters which define a Transition A event for the current stage, the process 200 continues to process step 210, while process step 208 is being performed. Furthermore, if the retrieved parameter set includes parameters which define a Transition B event for the current stage, the process 200 also continues to process step 214, while process step 208 is being performed. In some embodiments, the process steps 210, 214 may be performed approximately once each second while the process step 208 is being performed. In other embodiments, the process steps 210, 214 may be performed more or less frequently.

In process step 210, the controller 60 evaluates one or more input signals to determine whether the Transition A event for the current stage has occurred. As described above, the controller 60 will assemble a comparison, and possibly a Boolean expression linking several comparisons, based upon parameters specified for the current stage in the preselected parameter set to define the Transition A event. For instance, the controller may compare one or more of a clock signal, a cavity temperature signal, a cavity humidity signal, a meat probe temperature signal, and a door position signal (among other possible input signals) to one or more input values to determine if the Transition A parameters have been met. If the Transition A event has not yet occurred, the process 200 will loop back to process step 208.

If the controller 60 determines that the Transition A event has occurred in process step 210, the process 200 will proceed to process step 212. In process step 212, the controller 60 determines the next stage in the SCF based upon the Transition_A_Stage_Offset parameter specified for the current stage. The process 200 then loops back to process step 206 in which a new heating element behavior, and possibly a new convection fan behavior, are selected based upon the parameters specified for the new stage in the preselected parameter set. The process 200 will continue to loop through process steps 206-216, according to the selected SCF.

In process step 214, the controller 60 evaluates one or more input signals to determine whether the Transition B event for the current stage has occurred. As described above, the controller 60 will assemble a comparison, and possibly a Boolean expression linking several comparisons, based upon parameters specified for the current stage in the preselected parameter set to define the Transition B event. For instance, the controller may compare one or more of a clock signal, a cavity temperature signal, a cavity humidity signal, a meat probe temperature signal, and a door position signal (among other possible input signals) to one or more input values to determine if the Transition B parameters have been met. If the Transition B event has not yet occurred, the process 200 will loop back to process step 208.

If the controller 60 determines that the Transition B event has occurred in process step 212, the process 200 will proceed to process step 216. In process step 216, the controller 60 determines the next stage in the SCF based upon the Transition_B_Stage_Offset parameter specified for the current stage. The process 200 then loops back to process step 206 in which a new heating element behavior, and possibly a new convection fan behavior, are selected based upon the parameters specified for the new stage in the preselected parameter set. The process 200 will continue to loop through process steps 206-216, according to the selected SCF.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For example, although a range oven is depicted in the drawings, it will be understood by those of skill in the art that the present invention is applicable to wall ovens, double ovens, convection ovens, and other types of ovens. Furthermore, it will be appreciated that the teachings of this disclosure may be applied to any type of cooking appliance by those of skill in the art.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure as defined by the appended claims.

The invention claimed is:

1. A method of controlling a cooking appliance, the method comprising:

receiving an input corresponding to a staged cooking function;

controlling an algorithm flow of at least one of a proportional-integral-derivative algorithm and a hysteresis-based algorithm with a stored data configured in a data library corresponding to the staged cooking function;

retrieving a preselected parameter set from the data library, the preselected parameter set defining the staged cooking function and including a first heating element behavior parameter and a first temperature parameter;

selecting a first heating element behavior from a control library based upon the first heating element behavior parameter, wherein selecting the first heating element behavior comprises selecting the at least one of the proportional-integral-derivative algorithm and the hysteresis-based algorithm, which uses the first temperature parameter as a setpoint; and operating one or more heating elements according to the first heating element behavior and the first temperature parameter.

2. The method of claim 1, further comprising:

determining, while operating the one or more heating elements according to the first heating element behavior, whether a first event has occurred;

selecting a second heating element behavior from the control library based upon a second heating element behavior parameter, in response to determining that the first event has occurred; and operating the one or more heating elements according to the second heating element behavior and a second temperature parameter;

wherein the preselected parameter set also includes the second heating element behavior parameter, the second temperature parameter, and one or more parameters defining the first event.

3. The method of claim 2, wherein determining whether the first event has occurred comprises:

selecting an input signal based upon an input type parameter, the input signal indicating a condition of the cooking appliance; and comparing the input signal to an input value parameter using an input evaluator parameter;

wherein the preselected parameter set also includes the input type parameter, the input value parameter, and the input evaluator parameter.

4. The method of claim 3, wherein selecting the input signal comprises selecting one of a clock signal, a cavity temperature signal, a cavity humidity signal, a meat probe temperature signal, and a door position signal.

5. The method of claim 2, wherein determining whether the first event has occurred comprises:

selecting a plurality of input signals based upon a plurality of input type parameters, each input signal indicating a condition of the cooking appliance;

comparing each input signal to one of a plurality of input value parameters using one of a plurality of input evaluator parameters to generate a plurality of Boolean values; and evaluating a Boolean expression containing the plurality of Boolean values and one or more conditional operator parameters;

wherein the preselected parameter set also includes the plurality of input type parameters, the plurality of input value parameters, the plurality of input evaluator parameters, and the one or more conditional operator parameters.

6. The method of claim 2, further comprising:

determining, while operating the one or more heating elements according to the first heating element behavior, whether a second event has occurred;

selecting a third heating element behavior from the control library based upon a third heating element behavior parameter, in response to determining that the second event has occurred; and operating the one or more heating elements according to the third heating element behavior and a third temperature parameter;

wherein the preselected parameter set also includes the third heating element behavior parameter, the third temperature parameter, and one or more parameters defining the second event.

7. The method of claim 1, further comprising:

selecting a convection fan behavior from the control library based upon a convection fan behavior parameter, the convection fan behavior parameter being included in the preselected parameter set; and operating one or more convection fans according to the convection fan behavior, while operating the one or more heating elements according to the first heating element behavior.

8. An oven comprising:

one or more heating elements;

a memory device storing a control library, a data library and at least one executable file, wherein the control library includes a plurality of heating element behaviors and the data library includes at least one preselected parameter set having a first heating element behavior parameter and a first temperature parameter, and wherein the at least one executable file controls a basic operation of the oven and is separate from a stored data in the data library, the data configured to control an algorithm flow of at least one of a proportional-integral-derivative algorithm and a hysteresis-based algorithm for controlling the at least one preselected parameter set;

retrieving a preselected parameter set from the data library; and an electronic control unit configured to (i) access the preselected parameter set, (ii) select a first heating element behavior from the control library based upon the first heating element behavior parameter, wherein selecting the first heating element behavior comprises selecting the at least one of the proportional-integral-derivative algorithm and the hysteresis-based algorithm, which uses the first temperature parameter as a setpoint, and (iii) operate the one or more heating elements according to the first heating element behavior and the first temperature parameter.

9. The oven of claim 8, wherein: the at least one preselected parameter set further includes a second heating element behavior parameter, a second temperature parameter, and one or more parameters defining an event; and the electronic control unit is further configured to (i) determine whether the event has occurred, (ii) select a second heating element behavior from the control library based upon the second heating element behavior parameter, in response to determining that the first event has occurred, and (iii) operate the one or more heating elements according to the second heating element behavior and the second temperature parameter.

10. The oven of claim 9, further comprising:

a temperature sensor generating a temperature signal; and a timer generating a clock signal.

11. The oven of claim 10, wherein:

the at least one preselected parameter set further includes an input type parameter, an input value parameter, and an input evaluator parameter; and the electronic control unit is configured to determine whether the event has occurred by (i) selecting one of the temperature signal and a clock input signal based upon the input type parameter and (ii) comparing the selected signal to the input value parameter using the input evaluator parameter.

* * * * *